Patented June 21, 1949

2,473,995

UNITED STATES PATENT OFFICE 2,473,995

SYNTHESIS OF DIETHYL KETONE

William F. Gresham, Lindamere, Richard E. Brooks, Edgemoor Terrace, and William E. Grigsby, Wilmington, Del., assignors to E. I. du Pont de Nemours & Company, Wilmington, Del., a corporation of Delaware No Drawing. Application June 19, 1946, Serial No. 677,922

5 Claims. (Cl. 260—597)

This invention relates to the synthesis of organic oxygen-containing compounds and, in particular, to the synthesis of ketones by reaction between olefins, carbon monoxide, and hydrogen.

It was early observed by Patart (French Patent 593,648) that when a mixture containing ethylene, carbon monoxide, and hydrogen was heated under a pressure of 150 to 250 atmospheres at a temperature of 300° C. in the presence of a zinc chromate catalyst, a reaction product was obtained which consisted essentially of methanol and hydrocarbons, but which also contained very small quantities of aldehydes and higher alcohols. In 1930, it was reported by Smith, Hawk, and Golden (J. A. C. S., 60, 3221) that oxygen-containing compounds other than methanol were formed in 25% to 35% yield when mixtures of ethylene, carbon monoxide, and hydrogen were heated at temperatures of about 206° to 245° C., under atmospheric pressure in the presence of a cobalt-copper-manganese oxide catalyst. The nature of these oxygen-containing compounds was not ascertained, although aldehydes boiling below 100° C. were shown to be present. Later it was reported (German Patents 539,990 and 660,619) that mixtures of hydrogen and carbon monoxide react with ethylene at high temperature (500° C.) under increased pressures (150 atmospheres) to give a mixture of hydrocarbons, higher alcohols, and ketones. More recently an important advance was made by O. Roelen (U. S. Patent 2,327,066) who found that yields of propionaldehyde considerably higher than had been obtained theretofore could be realized by processing mixtures of ethylene, carbon monoxide, and hydrogen at a temperature of about 40° to 200° C. under a pressure within the range of about 20 to 300 atmospheres in the presence of hydrogenation catalysts; in one instance a liquid mixture containing 40% propionaldehyde and 20% diethyl ketone, was produced in this manner by Roelen. In the copending application of W. F. Gresham, R. E. Brooks and W. M. Bruner, S. N. 598,208, filed June 7, 1945, which issued as Patent No. 2,437,600 on March 9, 1948, it is disclosed that the reaction between ethylene, carbon monoxide, and hydrogen, under certain specific conditions, gives virtually quantitative yields of propionaldehyde, preferably at temperatures of 75° to 200° C. under a pressure of 325 to 1000 atmospheres, in the presence of a substantial excess of hydrogen. Moreover, in the copending application of W. F. Gresham, S. N. 636,263, filed December 20, 1945, it is disclosed that n-propanol is obtained in high yield from ethylene, carbon monoxide, and hydrogen at temperatures of about 250° to 400° C. under a pressure of about 325 to 1000 atmospheres in the presence of hydrogenation catalysts, when the initial ethylene:CO:$H_2$ ratio is from 1:2:2 to 1:5:20. None of the previously reported work on the reaction between ethylene, carbon monoxide, and hydrogen has given any hint as to how to control the reaction to obtain diethyl ketone selectively, rather than propionaldehyde or other products.

An object of this invention is to provide an improved process for the synthesis of ketones from olefins, carbon monoxide, and hydrogen. Another object is to control the reaction between ethylene, carbon monoxide, and hydrogen so as to obtain diethyl ketone in substantially improved quantity rather than the products which have been obtained according to the prior art. Other objects will appear hereinafter.

This invention involves the surprising discovery that at pressures in excess of 300 atmospheres, and under certain other reaction conditions hereinafter set forth, ketones are obtained in markedly improved yield, from olefins, carbon monoxide, and hydrogen. Moreover, it has been observed in accordance with this invention that the formation of propionaldehyde from ethylene, carbon monoxide, and hydrogen in the presence of hydrogenation catalysts is completely or substantially suppressed and diethyl ketone is formed in fair yield, provided the initial reaction mixture contains substantially less than the theoretically required quantity of hydrogen and a substantial excess of carbon monoxide. More particularly, it has been discovered in accordance with the invention that the reaction between ethylene, carbon monoxide, and hydrogen produces diethyl ketone selectively at pressures in excess of 300 atmospheres, preferably within the range of about 325 to 1500 atmospheres, at a temperature of about 50° to 350° C., preferably 100° to 275° C., in the presence of certain catalysts to be hereinafter disclosed, when the initial molal ratio of ethylene:$H_2$ exceeds 1:1 and the initial molal ratio of CO:$H_2$ is from about 2:1 to 50:1, preferably 5:1 to 20:1. The preferred initial molal ratio of CO:ethylene is about 1.2:1 to about 2.0:1. Outstanding results are obtained when the ethylene:CO:$H_2$ ratio is initially about 1:1.5:0.15 (cf. Example 1). In certain embodiments, the actual weight of hydrogen in such reaction mixtures is so small that, in batch experiments, the small amount of hydrogen which can be preliminarily adsorbed on the catalyst is sufficient for the formation of substantial quantities of diethyl ketone, when the said catalyst is brought into contact with mixtures of carbon monoxide and ethylene under the reaction conditions.

In one of its important aspects the invention may be viewed as a novel method for controlling competing reactions in the ethylene-H₂-CO system, so that diethyl ketone is obtained selectively. Thus, the present invention involves two competing reactions, e. g., (1) 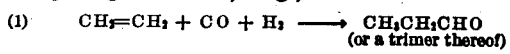
(or a trimer thereof)

(2) 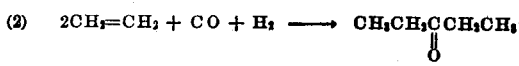

By a consideration of Equations 1 and 2, it does not appear that the relative quantities of diethyl ketone and propionaldehyde produced could be varied by controlling the initial ratio of CO:H₂, yet it has been discovered, as illustrated hereinafter, that, even though high yields of propionaldehyde or propyl alcohol (depending upon the temperature) are obtained when the CO:H₂ ratio is about 1:1.5 to 1:10 (as disclosed in applications S. N. 598,208 and 636,263), diethyl ketone is produced in fair yield when the CO:H₂ ratio is high, e. g., about 10:1.

The catalysts which may be employed include the hydrogenation catalysts generally, such as nickel, cobalt, iron, copper, ruthenium, and the like and mixtures or compounds thereof, such as nickel carbonyl, cobalt carbonyl, hydride-carbonyls of cobalt, etc. These materials may be used in combination with each other or with inert materials, such as kieselguhr, pumice, etc., or promoters such as ThO₂, Mn, etc. The amount of catalyst employed is generally about 0.1 to 10.0% based on the total weight of the reaction mixture.

The reaction is preferably conducted by heating a mixture of carbon monoxide, hydrogen, and ethylene in a suitable pressure-resistant vessel in the presence of one of the aforesaid catalysts. Maximum pressure is limited only by the strength of the retaining vessel and may be as high as 3000 atmospheres or even higher. The reaction may be conducted either batchwise or continuously. In one method of practicing the invention the ethylene, catalyst, and solvent are placed in a pressure vessel, and a mixture of carbon monoxide and hydrogen is injected under very high pressure. After the reaction is complete, the resulting liquid product is removed from the reaction vessel and the diethyl ketone is separated therefrom by any suitable method, such as by fractional distillation.

If desired, any inert liquid may be employed as a reaction medium, although the reaction can take place in the absence of inert diluents. Examples of suitable diluents which may be employed in the preparation of diethyl ketone are cyclohexane, xylene, methyl formate, and diethyl ether.

The invention is illustrated further by means of the following examples.

*Example 1.*—Ethylene (56 grams) and finely divided reduced sintered cobalt oxide catalyst (10 grams) were heated in a silver-lined shaker tube of 325 c. c. capacity, with a gas of the composition 10CO:H₂ at a temperature of 247° to 255° C. under a pressure of 575 to 755 atmospheres. This was done by heating the mixture containing ethylene and carbon monoxide to reaction temperature, and then introducing the hydrogen. The reaction was continued for 55 minutes, after which the mixture was removed and distilled. A low-boiling foreshot (3.3 grams) was obtained, following which a diethyl ketone fraction (B. P. 45°/100 mm. to 48°/105 mm.; weight, 10.8 grams; carbonyl number, 602—theory for diethyl ketone, 652) was distilled.

*Example 2.*—10 grams of a fused cobalt catalyst containing 3% copper was heated for 2 hours at 250° C. under 700 atmospheres hydrogen pressure in a copper-lined shaker tube. In this manner a catalyst containing adsorbed hydrogen was obtained. This catalyst was mixed with 123 c. c. of methyl formate and 28 grams of ethylene, and the resulting mixture was heated with excess carbon monoxide for 2 hours at 153° to 174° C. under 525 to 740 atmospheres pressure. Distillation of the product gave 4.4 grams of material having physical characteristics of diethyl ketone. Identity of this product as diethyl ketone was established by the melting point and mixed melting point of its 2,4-dinitro-phenylhydrazone.

While, in the foregoing examples, the invention is illustrated as a method for the preparation of diethyl ketone, it will be understood that the method can be adapted to the manufacture of other organic compounds derivable therefrom. For example, if the reaction period is prolonged, it is possible to hydrogenate the ketone, at least in part, to the corresponding alcohol.

The invention may be practiced by heating the reactants batchwise or continuously in any suitable pressure-resistant vessel such as an autoclave or tubular converter preferably made of or lined with inert materials such as glass, porcelain, inert metals and the like. If desired, materials of construction yielding small quantities of metallic carbonyls which are effective as catalyst may be employed. Outstanding results, however, are obtained in reaction vessels lined with silver or copper. In the continuous process, the reactants may be introduced at one or more points within the reaction vessel if desired. In certain instances, it is preferred to employ a tubular reaction vessel in which the temperature and pressure are not uniform throughout the length of the vessel.

The products obtained in accordance with this invention are widely useful, and are especially valuable as solvents, motor fuel additives, and intermediates for the manufacture of various organic chemicals, such as pentanol-3, etc.

Since many embodiments of the invention may be made without departing from the spirit and scope thereof, it will be understood that we do not limit ourselves except as set forth in the following claims.

We claim:

1. A process for the synthesis of diethyl ketone which comprises heating a mixture of ethylene, carbon monoxide, and hydrogen containing initially more than one mol of ethylene per mol of hydrogen and having an initial CO:H₂ molal ratio of from about 5:1 to 20:1 at a reaction temperature of about 50° to 350° C. in the presence of a cobalt catalyst under a pressure of 325 to 1500 atmospheres, and thereafter separating diethyl ketone from the resulting reaction product.

2. A process for the synthesis of diethyl ketone which comprises heating a mixture of ethylene, carbon monoxide, and hydrogen containing initially more than one mol of ethylene per mol of hydrogen and having an intial CO:H₂ molal ratio of from about 5:1 to 20:1 at a reaction temperature of about 100° to 275° C. in the presence of a cobalt catalyst under a pressure of 325 to 1500 atmospheres, and thereafter separating diethyl ketone from the resulting reaction product.

3. A process for the synthesis of diethyl ketone which comprises heating a mixture consisting of ethylene, carbon monoxide, hydrogen and an inert solvent containing initially more than one mol of ethylene per mol of hydrogen and having an initial CO:H₂ molal ratio of about 10:1 at a temperature of about 100° to 275° C. in the presence of a cobalt catalyst under a pressure of 325 to 1500 atmospheres, and thereafter separating diethyl ketone from the resulting reaction product.

4. A process for the synthesis of diethyl ketone which consists in heating a mixture consisting essentially of ethylene, carbon monoxide, and hydrogen in which the initial molal ratio of ethylene:CO:H₂ is about 1:1.5:0.15 at a temperature of about 100° to 275° C. in the presence of a cobalt catalyst under a pressure of 325 to 1500 atmospheres, and thereafter separating diethyl ketone from the resulting reaction product.

5. A process for the synthesis of diethyl ketone which comprises heating a mixture consisting essentially of ethylene and carbon monoxide to a temperature of about 100° to 275° C. in the presence of a reduced cobalt oxide catalyst, and thereafter injecting hydrogen into the said mixture, the relative quantities of ethylene, carbon monoxide and hydrogen being such that the molal ratio of ethylene:H₂ in the resulting reaction mixture is initially more than 1:1, and the molal ratio of CO:H₂ is initially about 5:1 to 20:1, under a pressure of 325 to 1000 atmospheres, and thereafter separating diethyl ketone from the resulting reaction product.

WILLIAM F. GRESHAM.
RICHARD E. BROOKS.
WILLIAM E. GRIGSBY.

REFERENCES CITED

The following references are of record in the file of this patent:

UNITED STATES PATENTS

| Number | Name | Date |
|---|---|---|
| 2,327,066 | Roelen | Aug. 17, 1943 |

OTHER REFERENCES

"Interrogation of Dr. Otto Roelen," by C. C. Hall et al., published July 18, 1947, by Office of Technical Services, Dept. of Commerce, Washington, D. C. Reprinted by Hobart Publishing Co., Box 4127, Chevy Chase Br., Washington 15, D. C., pages 44 and 45.